Dec. 31, 1968    J. SEIDEL ET AL    3,418,710
HIGH TEMPERATURE MAGNETIC CORES AND PROCESS
FOR PRODUCING THE SAME
Filed May 8, 1963    Sheet 1 of 2
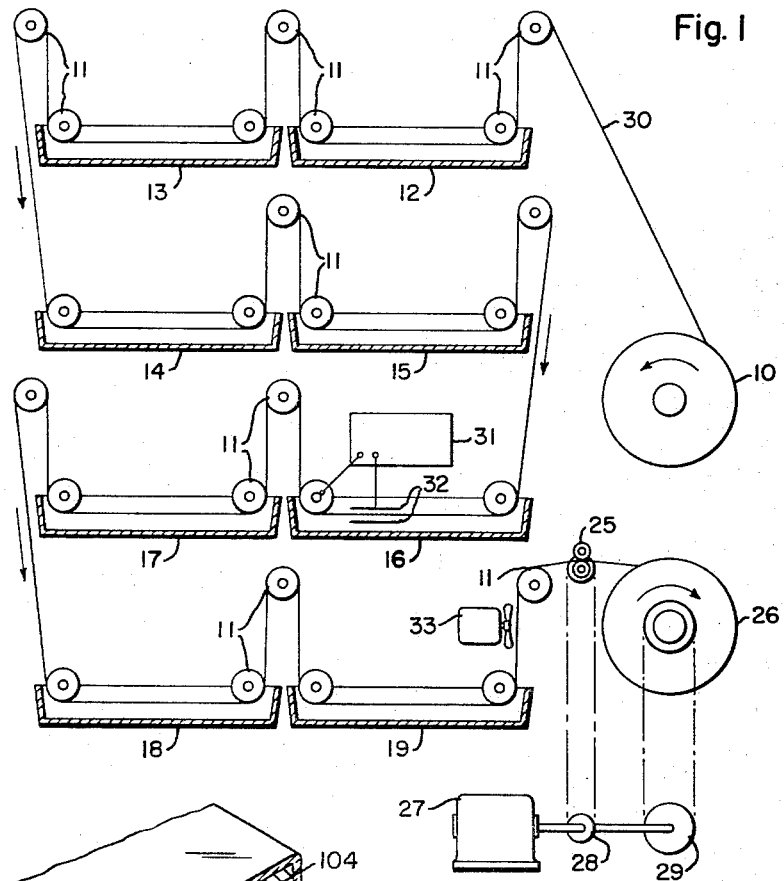
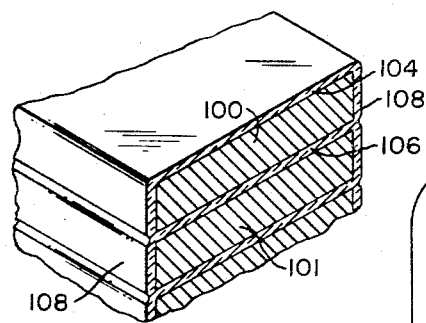
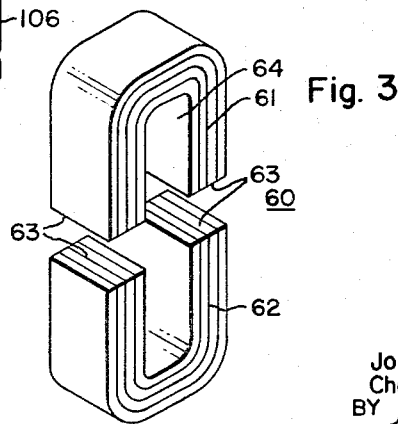
WITNESSES
John L. Chopps
James F. Young
INVENTOR
Joseph Seidel and
Charles A. Eaves
BY H. M. Snyder
ATTORNEY 3,418,710
HIGH TEMPERATURE MAGNETIC CORES AND
PROCESS FOR PRODUCING THE SAME
Joseph Seidel, Penn Hills, and Charles A. Eaves, Jamestown, Pa., assignors to Westinghouse Electric Corporation, Pittsburgh, Pa., a corporation of Pennsylvania
Filed May 8, 1963, Ser. No. 278,944
9 Claims. (Cl. 29—609)

This invention is directed to a process for making laminated magnetic cores bonded by an inorganic vitreous material, which cores are suitable for use at elevated temperatures, and to magnetic cores made by the process, and steel sheet with a vitreous coating.

Commercially wound magnetic cores of the type with which this invention is concerned are usually bonded with organic resins. The resin is introduced between adjacent laminations of the core and at room temperature such a resin-saturated wound core is well bonded and will not delaminate even when cut. These conventional cores are made by a rather complex process requiring a plurality of steps which must be carefully carried out to obtain a satisfactory product.

Typically, the process for making magnetic cores bonded with organic resins involves first coating a magnetic strip material with an inorganic electrical insulator such as magnesium phosphate, then winding the coated magnetic strip to core configuration, thereafter anntaling the wound core to remove stresses introduced in the winding process, next impregnating the core with the bonding resin in a vacuum environment to assure penetration of the resin between adjacent laminations, and lastly, oven curing the resin-impregnated core to harden the resin and thereby bond it to an integral whole. After curing, the core may be cut so that the preformed coils may conveniently be placed about the core.

It is clear from the above description of the process steps which must be carried out in a careful manner, and that a great deal of time is consumed in such operations. Further, the resin bonded cores produced by this process are not suited for use at temperatures in excess of about 200 or 250° C., above which temperature the resins presently used deterioriate, with the result that a core operating at such temperature delaminates and becomes substantially inoperative.

Accordingly, it is an objeect of this invention to provide bonded magnetic cores suitable for operation at elevated temperatures.

Another object of this invention is to provide a bonded magnetic core wherein the bonding is accomplished by an inorganic vitreous material.

Still another object of this invention is to provide a process for bonding magnetic cores wherein the bonding operation is carried out simultaneously with the stress relief of the magnetic strip material.

It is also an object of this invention to provide in a bonded magnetic core an inorganic vitreous material serving as insulation between adjacent laminations and as the bonding material which holds the laminations together.

It is a further object of this invention to provide a greatly simplified process for bonding magnetic cores.

Other objects of the invention will in part, be obvious and, in part, will appear hereinafter.

For a better understanding of the nature and objects of the invention, reference should be made to the following detailed description and drawings, in which:

FIGURE 1 is a schematic diagram showing how silicon-iron sheets or strips may be treated in accordance with this invention to prepare the surface of the sheet for further processing;

FIG. 3 is an exploded perspective view of a bonded cut core comprising two U-shaped core segments; and FIG. 4 is an enlarged showing of laminations which have been bonded with glass in accordance with this invention.

Figure 2:
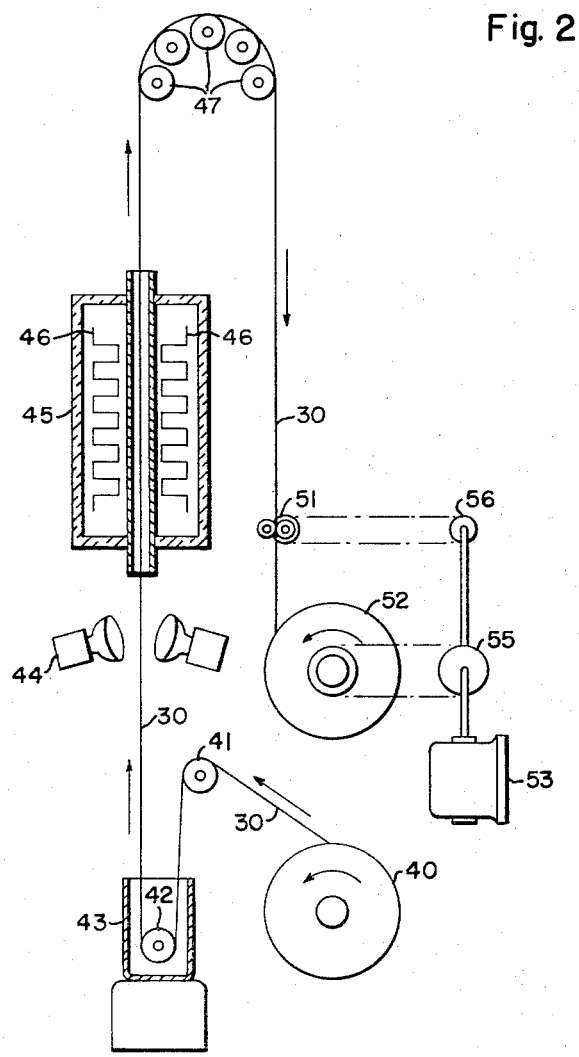
FIG. 2 is a schematic diagram showing how a vitreous coating may be applied to the magnetic sheet.

The novel process of ths invention includes a preliminary surface treatment for cleaning the surface of the magnetic strip, providing the magnetic strip with a thin continuous coating of a fussed vitreous material, winding the magnetic strip into a core configuration, heating the wound magnetic core to fuse the vitreous material and thereby stress relief annealing the magnetic strip, and cooling the bonded magnetic core to solidify the vitreous material and thereby bond the core to an integral whole. Thereafter, the bonded magnetic core may be appropriately cut to form a pair of C-core halves.

The magnetic core of this invention comprises a plurality of laminations of a magnetic strip material, the laminations being insulated from each other and bonded together by a fused vitreous material.

In FIG. 1 there is shown schematically one process for preparing the surface of the magnetic sheet for subsequent coating with the vitreous material. In FIG. 1, the payoff reel 10 on which the magnetic strip 30 to be treated is wound, freely turns as the drive rollers 25 and take-up reel 26 pull the magnetic strip through the series of baths indicated at 12 through 19. The magnetic strip 30 is guided through the baths by a plurality of idler rollers 11. The magnetic strip 30 is thus first guided into degreasing tank 12 to remove any traces of oil or grease. Tank 13, into which the magnetic strip is next guided, is a water rinse which has the function of removing the degreasing solution from the strip. Following the rinse, the strip is guided into tank 14 which contains a pickling solution for removing any oxides which may have formed on the surface of that magnetic strip and to etch the surface thereof. There are a number of satisfactory pickling solutions including solutions of HCl, $H_2SO_4$, solutions containing both of these acids, and solutions of $H_3PO_4$. Following the pickling treatment the magnetic strip is guided into tank 15 for a second water rinse to remove the pickling solution. Tank 16 contains a nickel plating solution and the magnetic strip is guided between the electrodes 32 to produce a nickel flash on the magnetic strip. The plating transformer 31 provides the necessary electric current for the plating process.

Following the application of the nickel flash the magnetic strip is again given a water rinse in tank 17 and the rinse is followed by a neutralizing bath in tank 18 whereby any residual acids carried over from previous treatments are neutralized. One satisfactory neutralizing solution which has been used is a 0.02% aqueous solution of $NaCO_3$. In tank 19 the magnetic strip is passed through an acetone bath to aid in removing water from the strip surface. A drying fan 33 promotes the rapid evaporation of the acetone and then the strip passes over the last idler roller and through the drive rollers 25, which are driven by the power train 28 from the drive unit 27, and then to the take-up reel 26 which is driven by the power train 29 of the drive unit 27.

The nickel flashing provided by the process described is a very thin layer of nickel which is particularly desirable as a barrier layer when silicon-iron magnetic strip is being coated. In the absence of a barrier layer, FeO may diffuse into the glass coating and alter its composition deleteriously.

The arrangement shown in FIG. 1 is one possible arrangement of baths for providing a clean and dry magnetic strip material having a nickel flashing thereon. Different combinations and arrangements of tanks can be employed which would be equally satisfactory.

Following the surface treatment just described the magnetic strip material is provided with a thin fused coating of a vitreous material. One satisfactory apparatus for accomplishing this is the coating line shown in FIG. 2. The magnetic strip 30 is fed through the coating line by the take-off reel 40. The magnetic strip 30 passes over the idler wheel 41 and into the binder trough or tank 43 around the idler wheel 42, which is submerged in the slip (a suspension of vitreous particles in a suitable organic vehicle such as amyl acetate or isopropyl alcohol) in the binder tank. In the binder tank the magnetic strip is provided with a thin coating of slip. The thickness of the coating which the magnetic strip acquires will depend on the speed of the magnetic strip through the binder tank and upon the consistency of the slip. Excess slip drains back into the binder tank as the strip emerges vertically from the slip.

The magnetic strip 30 passes upwardly between a set of infrared drying lamps 44 which dry the slip coating to a powdery slightly adherent layer. The coated magnetic strip then passes through the tube furnace 45 with its heating elements 46 in which the powdery coating is fused to a thin continuous layer. It should be noted that the apparatus is so constructed that the strip surfaces do not contact any part of the apparatus while the coating is in a powdery, easily removable condition. The vitreous coating solidifies quickly on emerging from the tube furnace and the strip passes over a series of idler rollers 47 which direct the magnetic strip in a downward path through the drive rollers 51 onto the take-up reel 52. The drive rollers 51 and the take-up reel 52 are driven by the power trains 55 and 56, respectively, from the drive unit 53.

While a dipping technique has been described for applying the slip to the magnetic strip, it will be apparent that the slip may be applied by roller or by spraying.

In applying the process of this invention the nature of glass must be considered. As is well known, in a glass the viscosity continuously decreases as the temperature is increased since glass does not have a precise melting point. The viscosity-temperature relationship of a particular glass will depend upon its composition. At about room temperature the glasses of this invention are quite rigid with viscosities of $10^{17}$ poises and higher. In order to obtain the desired thin continuous fused glass insulating coating on the surfaces of the laminations in the coating process, the glass particles must be heated to the fluid condition represented by a viscosity of about 5000 poises. After the core is wound, the annealing of the magnetic strip and the simultaneous bonding of the laminations is carried out at the softening point temperature of say, 825° C., at which temperature the glass is in a plastic condition, having a viscosity of about $10^7$ poises. At this viscosity, the glass coatings of the individual laminations fuse and bond together when in intimate contact. The glass bonded cores of this invention have a maximum operating temperature as high as the temperature of the deformation point of the glass (approximately $10^{11}$ to $10^{12}$ poises). At the deformation point, the glass-bonded core will begin to lose its structural integrity and delamination can occur.

The glass selected for a particular application will depend upon the service temperature and annealing temperature requirements of the core. Glasses in which at least one of the oxides of silicon, boron and phosphorus are the glass-formers may thus all be used in the process of this invention when the service and annealing temperature requirements of the device being made permit. Mixtures of these glass-formers may be employed as well. There are innumerable combinations of glass constituents capable of producing satisfactory results in this application.

As the service temperature requirements become more severe, the glass compositions which can be employed narrow to some extent. In the examples given of the process of this invention, the glass employed as a coating material is of a matched or tailored composition so as to be compatible with the particular magnetic strip material being treated. Particularly, the softening point temperature of the glass is in the same temperature range as the stress relief annealing temperature of the magnetic sheet. However, this is not necessarily a requirement for all applications. For example, the softening point temperature of the glass might be substantially lower than the requisite annealing temperature of the magnetic sheet, but such a core would have a relatively lower service temperature. The real limitation in such a case is that the glass must have a viscosity at the annealing temperature sufficient to adhere to the metal strip and must not be so fluid as to run freely off the metal strip.

The following glass compositions have been found to be extremely satisfactory for the silicon-iron magnetic materials.

TABLE I.—GLASS COATING COMPOSITIONS, WT. PERCENT

| | Range | Specific Composition |
|---|---|---|
| $SiO_2$ | 36.00–54.65 | 41.92 |
| $B_2O_3$ | 5.05–18.00 | 11.70 |
| $Al_2O_3$ | 2.00–7.35 | 4.88 |
| $Na_2O$ | 3.65–18.00 | 17.55 |
| $K_2O$ | 7.00–30.45 | 6.82 |
| $CaO$ | 0.00–10.00 | |
| $CaF_2$ | 0.00–5.00 | 4.88 |
| $BaO$ | 0.00–20.90 | 9.75 |
| $ZnO$ | 0.00–4.05 | |
| $ZrO_2$ | 0.00–1.35 | |
| $MnO_2$ | 0.50–1.00 | 0.50 |
| $NiO$ | 0.50–1.00 | 0.50 |
| $CoO$ | 0.50–1.50 | 1.50 |

In this formulation boron oxide can be reduced to 2%, or less. Sodium oxide can replace the potassium oxide. Manganese, nickel and cobalt oxides can be left out. Other glass compositions are also suitable. Glasses containing up to 15% $ZrO_2$ and 15% $TiO_2$ can be made following the above formulation.

In making the slip the glass was wet ground in a ball mill for fifty-four hours. After grinding, the glass particles were passed through a 400 mesh screen to remove random coarse particles. The average particle size after screening was about 1.5 microns.

To maintain the vitreous particles in suspension in the slip there is usually a deflocculating agent present. Such a deflocculating agent is disclosed in copending application Ser. No. 276,247, filed Apr. 29, 1963. The preferred defloculant set forth in the above-identified application is the boric acid ester of 2-methyl-2,4-pentanediol commonly referred to as triherylene glycol diborate.

In using the apparatus shown in FIG. 2 to coat magnetic sheet, magnetic strip speeds of from 3 to 5 feet per minute have been employed successfully. The thickness of the fused vitreous coating on the magnetic strip may range from about 0.1 mil to about 1 mil or even more.

In the furnace, the ambient temperature is maintained at from about 850° C. to 950° C. depending on the speed at which the magnetic strip is moving and on the cross-sectional area of the strip. The higher temperatures are employed at higher strip speeds or when strip of greater cross-section is being coated. In the furnace the glass softens and flows together and fuses to form a bubble-free continuous coating on the magnetic strip.

The magnetic strip with its thin vitreous coating thereon which is the product of this coating process is remarkable for the flexibility of the coated strip and in this respect, far exceeds what might be expected from the brittleness which is known to characteristic glass.

The extreme flexibility of the glass coated magnetic strip enables it to be wound into core form at room temperature without disturbing the adhesion of the coating to the magnetic strip. Therefore, conventional high speed commercial core winding equipment operating at room temperature can be used for winding the cores. Such high speed equipment can wind a core in a very few minutes, i.e., two or three minutes is sufficient for cores of moderate size.

It will be understood that the winding of the core introduces stresses into the magnetic material and these stresses must be relieved. Further, the laminations of the core must be bonded together to fix the core shape in its final configuration. It has been found that with the core provided with a glassy coating as described above, the bonding of the core and the stress relief anneal can be carried out simultaneously in a single operation. To accomplish this the formed core is placed in a furnace, a weight is placed on the core at the region where the core will be cut to assure contact between adjacent turns, and then the score is heated to a temperature of from about 700° C. to about 900° C. In some cases the annealing temperature may be as high as 1000° C.; the temperature used depends upon the magnetic material undergoing treatment. Grain oriented silicon-iron may be annealed for three hours at 835° C. with satisfactory results. In general, an annealing time of from 1 to 4 hours is employed. This treatment is sufficient to stress relieve the material and the adjacent laminations of the core are bonded together by the fusing of the glassy adhesive coating thereon.

The interlaminar adherence of the cores thus formed is sufficient to permit the cutting of the cores with standard commercial equipment without delamination. Such a wound cut core is shown in FIG. 3 of the drawing wherein the core 60 has been cut into two parts, 61 and 62, with substantially plane faces 63, whereby, when the core halves are reassembled, forming the window 64, there is not appreciable air-gap loss between the faces.

In FIG. 4 there is shown an enlarged view of a pair of glass bonded laminations 100, 101 from a core made in accordance with the invention. Each of the laminations is surrounded by the fused glass coating. The layer of glass 104 represents the glass coating on the outermost laminates 100. The interlaminar glass layer 106 bonds laminations 100 and 101 and insulates them one from the other. The glass layer 108 insulates the edges of the laminations. The exposed metal visible in the figure is located at a cut face of the core.

Cores made in this fashion have been heat aged at temperatures up to 600° C. without deterioration of either adherence or rigidty.

Transformer cores were made in accordance with this invention and tested for core loss as described in the following examples.

EXAMPLES

Single oriented silicon-steel sheet having about 3.5% silicon therein, in 2, 4 and 12 mil nominal thicknesses, was obtained in coil form. The sheet surfaces were bare, and were slit to provide 1 inch and 2¼ inch strip widths. The magnetic strip was passed into a series of tanks which successively degreased, pickled and provided the strip with a nickel flashing.

The composition of the glass coating selected for the cores was as follows:

*Coating (calculated weight percent)*

| | |
|---|---|
| $SiO_2$ | 42.49 |
| $B_2O_3$ | 2.44 |
| $Al_2O_3$ | 3.63 |
| $Na_2O$ | 21.75 |
| $K_2O$ | 0.02 |
| $TiO_2$ | 9.11 |
| $ZrO_2$ | 12.33 |
| $BaO$ | 5.38 |
| $CaO$ | 0.01 |
| $ZnO$ | 2.85 |

The magnetic strip was provided with a vitreous coating of the above composition in an apparatus of the type shown in FIG. 2. The magnetic strip was first passed through a container having therein a slip containing the vitreous frit and then the slip was dried on the strip to a powdery condition and thereafter passed through a furnace at a temperature of 915° C. at which temperature the vitreous material fused and provided a thin uniform glassy coating on the magnetic sheet. The strip was passed through the slip and furnace at the rate of about four feet per minute. The coated, cooled strip was then wound to coil form. Cores were then wound on mandrels from the strip on standard core winding machinery. The cores were left on the mandrels to assure the retention of the window dimensions and shape. The dimensions of the core window of each core were either ⅞ x 2¼ inches with a ⅜ inch build-up of wound strip or the core window was 1 x 3 inches with a 1 inch build-up. In winding the cores a slight excess number of turns was employed.

The cores were then stacked in a furnace in a manner which assured that a continuous load was maintained on the laminations at the region of cut. A forming gas (90% $N_2$–10% $H_2$) was introduced into the furnace and the cores annealed at 825° C.

After annealing in the furnace for 3 hours the bonded cores were removed from the furnace, cooled and the mandrels were removed by means of a hydraulic press.

The cores were clamped between expandable 0.060 inch steel plates and then cut by an abrasive cutting disc. The cut faces of the cores were ground by a diamond wheel on a surface-grinder. The cut faces of the core halves were then etched to remove burrs.

The core halves were then trimmed to size by removing the excess inner and outer turns until the precise desired window dimensions and build-up were obtained. The core halves were then carefully aligned and assembled with a coil around one leg of the core, and then the core was banded with a steel banding strap to maintain the two core halves in assembled relation. The cores were then tested for core loss at room temperature after aging at 400° C. for periods of 250 and 500 hours. Other samples were tested after aging at 600° C. The cores were found to have relatively low core losses both before and after aging.

A series of cores made in accordance with this invention were made and tested for core loss at room temperature before aging and after aging. The results obtained are shown in Table II. For the identification of the C core samples tested, a three symbol code is employed in Table II consisting of a number (1 and 2), a letter (L, H, and A), and a number (1 through 8). The numbers which preceed the letter represent the core size as follows:

| | Number |
|---|---|
| Core having a width of 1 inch, ⅞ x 2¼ inch window, and a ⅜ inch build-up | 1 |
| Core having a width of 2¼ inches, 1 x 3 inch window, and a 1 inch build-up | 2 |

The letters represent the nominal steel thickness of the core as follows:

| | Mils |
|---|---|
| Letter L | 2 |
| Letter H | 4 |
| Letter A | 12 |

A two-symbol combination of the above numbers and letters represents the core type. Numbers 1 through 8 which follow the letter identify the core sample. For example, the code 2H4 represents the fourth sample of core type 2H which is the larger core size constructed with 4 mil steel.

TABLE II.—CORE LOSS IN WATTS PER POUND AT 15 KG.[1]

[400° C. aging]

| Treatment | 1L1 | 1L2 | 2L1 | 2L2 | 1H1 | 1H2 | 2H1 | 2H2 | 1A1 | 1A2 | 2A5 | 2A6 |
|---|---|---|---|---|---|---|---|---|---|---|---|---|
| Room temperature before aging | 8.7 | 7.5 | 6.7 | 8.2 | 9.7 | 8.7 | 9.4 | 8.0 | 0.78 | 0.78 | 0.82 | 0.75 |
| 250 hours at aging temperature | 10.5 | 8.5 | 8.5 | 9.2 | 9.7 | 9.3 | 11.7 | 11.1 | 0.79 | 0.78 | ([2]) | -------- |
| 500 hours at aging temperature | 11.0 | 9.0 | 8.9 | 9.7 | 9.9 | 9.3 | 12.0 | 12.0 | 0.84 | 0.79 | ([2]) | -------- |
| Room temperature after aging | 10.3 | 8.7 | 8.7 | 9.2 | 10.2 | 9.8 | 11.5 | 10.4 | 0.88 | 0.87 | ([2]) | -------- |

[1] Cores L and H at 400 c.p.s., cores A at 60 c.p.s.
[2] Not tested.

A rejection limit based upon a core loss of 10 watts per pound, has been commonly employed in determining the acceptability of organically bonded commercial cores of the H type. Similarly, a rejection limit of 0.9 watt per pound has been used in evaluating cores of the A type. It will thus be observed that at room temperature before aging all of the cores listed in the above Table had acceptably low core loss and that even after severe aging at 400° C. for 250 hours all of the A cores and some of the H cores were still within acceptable limits. Further, after 500 hours at aging at 400° C. the number of cores which exceeded the rejection limit had not increased. It will be understood that organically bonded cores could not be subjected to these tests since such cores would delaminate at the test temperature and meaningful test readings would not be obtained.

An important feature is that the glasses employed have a lower coefficient of expansion than the metals which they are used to coat. Therefore, when the metal-glass composite element cools from the annealing temperature the metal contracts more than the glass coating. The metal is, therefore, placed in tension while the glass coating is under compression. It has been found that placing magnetic laminations under tension decreases the magnetostriction of the lamination. Since magnetostriction produces noise and hum in transformer cores, the reduction of magnetostriction accomplished by the glass coating reduces the noise level of the transformers.

The process of this invention which has been described greatly simplifies the manufacture of magnetic cores by substituting a single glass coating for the former magnesium phosphate and organic resin coatings and further substitutes a single combined annealing and bonding operation for the previous separate annealing and resin-curing heat treatments.

It will be understood that the process of the invention is suitable for any metallic strip material and for both oriented and unoriented magnetic strip material. The process of the invention has been practiced on 12% aluminum-iron magnetic strip and on 3.5% silicon-iron magnetic strip, and on cobalt-iron magnetic alloys, one containing 27 percent cobalt and another containing 35% cobalt. The cores have been made from magnetic strip materials having thicknesses of 2, 4, 5, 8 and 12 mils thickness. C-cores have been made in strip widths of 3/8 inch, 7/8 inch, and 2¼ inches. Toroidal cores and stacked cores of laminations punched from glass-coated magnetic strip have been made.

From the preceding description it will be appreciated that a relatively simple process has been set forth for producing magnetic cores suitable for operation at elevated temperatures. The process has been so refined that it offers substantial advantages over processes currently employed to produce magnetic cores which do not have the capability of withstanding elevated temperatures.

Since certain changes in carrying out the above process and certain modifications in the article which embody the invention may be made without departing from its scope it is intended that all matter contained in the above description are shown in the accompanying drawings shall be interpreted as illustrative and not in a limiting sense. Therefore, it is desired that the invention be interpreted as broadly as possible and that it be limited only by what is expressly set forth in the following claims.

We claim as our invention:

1. In a method for making a bonded magnetic core from magnetic metal which is suitable for use in high temperature environments the steps comprising, preparing the surface of the metal for subsequent coating thereon of a thin layer of an inorganic glassy adhesive, fusing on the magnetic metal a continuous nonporous thin layer of inorganic glassy adhesive at a first elevated temperature, assembling the coated metal into a plurality of layers to form a core, placing the formed core in a furnace and loading it to assure substantial contact between adjacent layers of the core, heating the core to a second elevated temperature somewhat lower than the first elevated temperature and in the range of from about 700° C. to about 1000° C. for a period of about 1 hour to 4 hours to stress relieve the magnetic metal and soften the glassy adhesive to bond adjacent layers of the core to each other.

2. The method of claim 1 wherein the bonded core is thereafter cut to form a pair of C-core halves.

3. A process for making a magnetic core from a magnetic metal material having a thickness not in excess of 12 mils comprising the steps of preparing the surface of the magnetic material for the subsequent coating thereof with a thin layer of vitreous material, coating the metal surface with a thin nonporous continuous layer of fused vitreous material at a first elevated temperature, assembling a core consisting of a plurality of layers of coated magnetic metal in intimate contact with each other, heating the assembled core to soften the vitreous material at a second elevated temperature somewhat lower than said first elevated temperature and in the annealing temperature range of said magnetic metal so that the adjacent layers of vitreous material coalesce, and cooling the core to harden the vitreous material thereby bonding the core layers into an integral whole with the interlaminar vitreous material electrically insulating adjacent magnetic metal layers from each other.

4. A process for making a magnetic core from iron-silicon magnetic sheet comprising the steps of cleaning the sheet surfaces to remove oxide film and other foreign matter, coating the sheet with a thin metallic barrier layer, coating the sheet surfaces at a first elevated temperature with a thin continuous layer of fused vitreous material, winding the sheet into wound core form, placing the formed core in a furnace and loading it to assure substantial contact between adjacent turns of the core, heating the core to a second elevated temperature in the range of from about 700° C. to about 1000° C. for a period of about 1 hour to 4 hours thereby stress relieving the magnetic sheet and softening the vitreous material so that adjacent layers of vitreous material coalesce, and cooling the core to solidify the vitreous material thereby bonding adjacent turns of the core to each other to form a integral core with the vitreous material electrically insulating adjacent turns of the core from each other.

5. The method of claim 4 wherein the bonded core is thereafter cut to form a pair of C-core halves.

6. A process for making a magnetic core from iron-silicon magnetic material having a continuous coating of glass fused to the surface thereof, comprising the steps of, assembling the glass coated material into core form having a plurality of adjacent layers, placing the formed core in a furnace and heating the core to a temperature of from about 700° C., to 1000° C. to stress relieve the magnetic material and soften the glass so that adjacent layers thereof coalesce, and cooling the core to solidify the glass and thereby bond the adjacent turns of the core to each other to form an integral core with the glass insulating adjacent turns of the core from each other.

7. The method of claim 6 wherein the glass has a thermal coefficient of expansion less than that of the magnetic sheet.

8. The method of claim 7 wherein the magnetic sheet has an oriented grain structure to provide preferred directions of magnetization.

9. The method of claim 7 wherein the bonded core is thereafter cut to form a pair of C-core halves.

References Cited

UNITED STATES PATENTS

| | | | |
|---|---|---|---|
| 2,394,047 | 2/1946 | Elsey et al. | 336—219 |
| 2,568,881 | 9/1951 | Albers-Schoenberg | 336—233 |
| 2,802,187 | 8/1957 | Evans et al. | 336—219 X |
| 2,820,720 | 1/1958 | Iversen | 336—233 X |
| 3,068,437 | 12/1962 | Jones | 29—155.57 X |
| 1,774,856 | 9/1930 | Van Deventer | 336—219 |
| 1,877,569 | 9/1932 | Falkenthal | 336—219 |
| 3,132,413 | 5/1964 | Stopps | 29—155.27 |
| 3,164,889 | 1/1965 | Beardsley et al. | 29—155.57 |
| 2,561,462 | 7/1951 | Compton et al. | 29—155.57 X |
| 2,920,296 | 1/1960 | Neurath | 336—218 X |
| 2,976,171 | 3/1961 | Sullivan | 117—53 |

JOHN F. CAMPBELL, *Primary Examiner.*

C. E. HALL, *Assistant Examiner.*

U.S. Cl. X.R.

29—605; 117—129